May 30, 1950 P. YVES MARIE LE CALVEZ 2,509,829

DUPLEX TELEGRAPH SYSTEM

Filed Aug. 11, 1947

INVENTOR.
Philippe Yves Marie Le Calvez
BY Ben. J. Chromy
his attorney

Patented May 30, 1950 2,509,829

UNITED STATES PATENT OFFICE 2,509,829

DUPLEX TELEGRAPH SYSTEM

Philippe Yves Marie Le Calvez, Paris, France, assignor to Societe Française Sadir-Carpentier, Paris, France, a corporation of France Application August 11, 1947, Serial No. 767,978
In France May 17, 1944

Section 1, Public Law 690, August 8, 1946
Patent expires May 17, 1964

2 Claims. (Cl. 178—58)

Figures 1, 2:
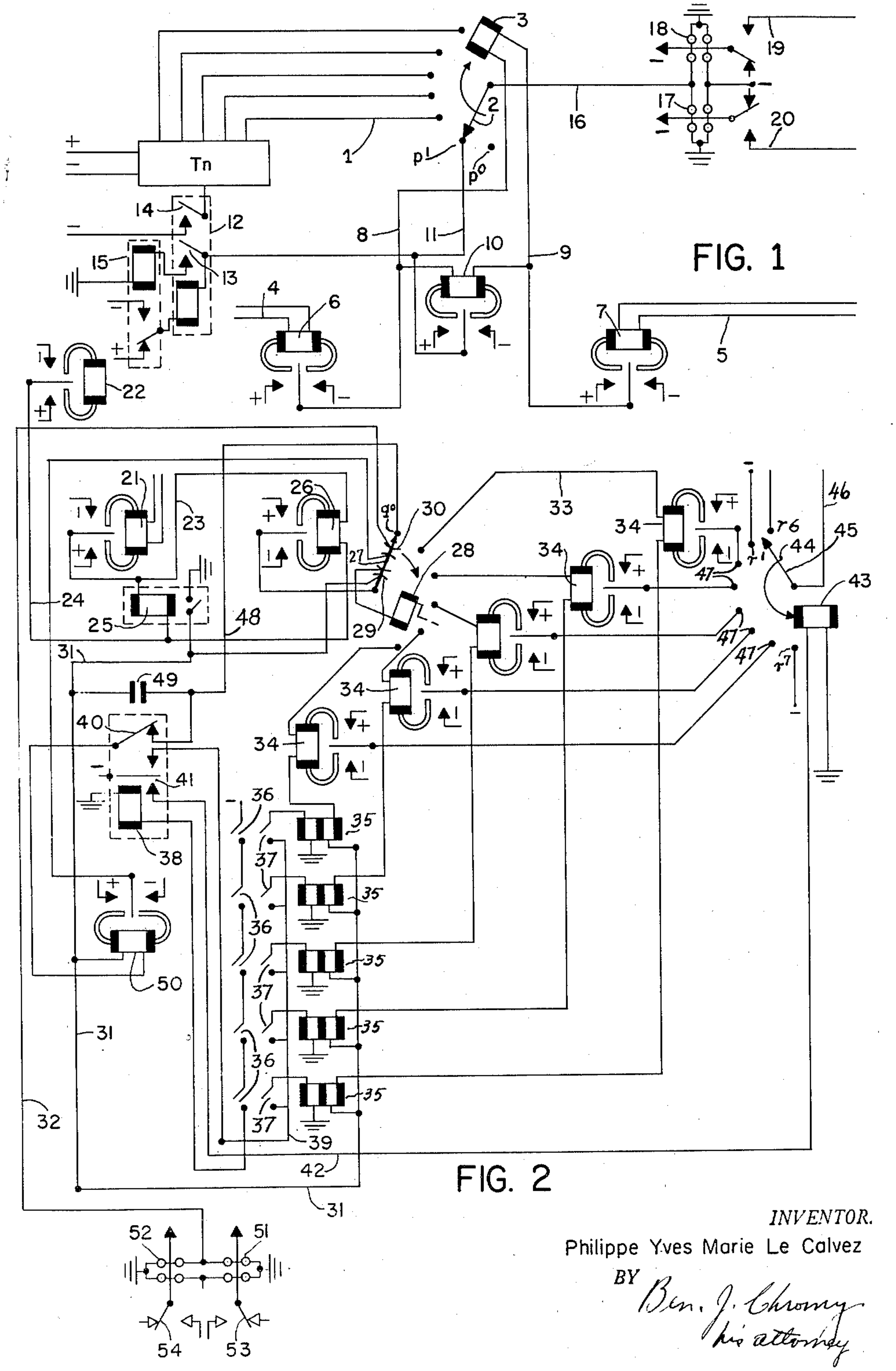

This invention which relates to telegraph systems is for improvements in or modifications of the invention disclosed in my copending specification Serial No. 770,416, filed August 25, 1947, and entitled: "Telegraph system."

Said copending specification describes a telegraph system the chief characteristic of which lies in the positive checking by the transmitter of the correct reception of the previously transmitted signal before the transmission of the next signal. In the radio telegraph system therein described the signal corresponding to an element to be transmitted is decomposed into a predetermined number of elemental signals, each elemental signal being characterized by the transmission of one or the other of a pair of modulation frequencies which is allotted to it, all these modulation frequencies being preferably sent on a single carrier wave. The positive checking is obtained by means of an additional modulation sent back over the oppositely directed channel of the duplex system, and finally the transmission of each signal is accompanied by another modulation, called the starting or identification frequency, which characterizes it.

The present invention seeks to provide simplified systems embodying the method described in said copending specification while retaining the advantages thereof the most important of which is, the maintaining of a very high degree of reliability or correctness of transmission whatever the conditions of propagation.

As will be seen later the simplified systems of the invention allow duplex communication by using for the reverse or oppositely directed channel two other pairs of modulation frequencies one of which is used for the starting frequency and for the transmission of code signals, and the other for checking.

According to the present invention, use is made for the transmission of the identification or starting signal and of the elemental signals characterizing the element to be transmitted, of one pair of frequencies, one or other of said frequencies preferably modulating a transmitter of the telephone or modulated telegraphy type, and serving successively for the starting frequency and the signalling frequency proper. My copending specification describes, among other things, a system in which the various modulation frequencies are impressed on the carrier wave consecutively by means of a distributor instead of simultaneously. The present invention provides improved systems of this nature which are simplified by reason of the use of only one pair of modulation frequencies.

The invention is illustrated in and further explained with reference to the accompanying drawings which show, by way of example, a preferred embodiment Figures 1 and 2 being, respectively, diagrams of the transmitter and of the cooperating receiver.

In the drawings the radio circuits have been omitted as not forming per se, parts of the invention. The transmitter station (Fig. 1) comprises, as in my copending specification, a transmitter $Tn$ importing different polarities to the leads 1 connecting it to the distributor 2. Five leads have been shown corresponding to a five-unit code, but it will be obvious that the invention may be used whatever be the number of units in the code. The distributor is so arranged that once started by the relay 3 its brush effects one and only one complete revolution from the inoperative position in which the brush is on contact $P^0$. Assuming $\varphi 1$ and $\varphi 2$ to be the checking frequencies transmitted over the reverse channel, and $f1$ and $f2$ the pair of frequencies serving both as the starting and signalling frequencies, the reception of frequency $\varphi 1$ actuates through leads 4 a relay 6 of the compensating winding type which becomes inoperative again in the absence of $\varphi 1$. Similarly the frequency $\varphi 2$ actuates the symmetrical relay 7 through leads 5. It will therefore be seen that in the leads 8—9 there will flow a current whose direction is characteristic of the frequency $\varphi 1$ or $\varphi 2$ received, the circuit in question being the same as the corresponding circuit of the arrangements described in my copending specification. The current flowing through leads 8—9 actuates the relay 3 in the same manner whatever be its direction, and also actuates the relay 10, the armature of which imparts + or − polarity to the lead 11 according to the directions of the current in 8—9, this relay 10 being adjusted so as to be indifferent as to polarity. It will be seen that in this case also, in the case of fading or static, no current flows through 8 and 9, and consequently the relays 3 and 10 do not move.

The lead 11 is connected to the first contact $P1$ (after the dead contact $P^0$) of the distributor 2, and to a relay 12 with two contacts 13 and 14. The lead 11 is connected to this end to the armature of the contact 13 and also to one end of the energization coil of relay 12, the other end of which coil is connected to the armature of a second relay 15 which is adjusted so as to be indifferent as to polarity. Relay 15 imparts + or − polarity to its armature according to the position thereof and the coil of the said relay is connected between ground and the contact 13 of the relay 12.

Contact 14 controls the feed of the translating device T*n*, as in the arrangement of the copending specification. When there is no current flowing through its energization coil the relay 12 has its contacts 13 and 14 open. As is customary the + and — polarities are connected to the poles of the usual battery the mid point of which is grounded. This is also the case for Fig. 2.

A sufficient distance is provided between the contacts P1 and $P^0$ of the distributor 2 for the transmitter T*n* to have time to change from one combination to the other during the energization of 3 and the travel of the brush from the contact $P^0$ to the contact P1.

In order to avoid too great a loss of time due to the inertia of the ordinary known band transmitters use may be made of a system of two transmitters which are alternately placed in communication with the distributor by means of a reversing switch which can be controlled by the change of polarity of the armature of the relay 10. In order to obtain correct correlation at the receiving end two distributors may be used similar to the distributor 45 which may be alternately connected to the armatures of the relays 34 according to the polarity of the starting frequency received.

The brush of the distributor 2 supplies through lead 16 the energization coils of relays 17 and 18 of the compensated type, the other ends of these coils being grounded. According to the polarity applied to the lead 16, the relay 17 or the relay 18 becomes operative, thereby imparting a predetermined polarity, for example to the lead 19, thus producing transmission of frequency *f*1, or to the conductor 20 to produce the transmission of the frequency *f*2.

The operation of the transmitter is as follows: if the previous signal corresponding to the starting frequency *f*1, for example has been correctly received, the checking frequency φ1 is returned and operates the relay 10, which reverses the polarity in the lead 11. As the relay 15 was previously in contact with the same polarity as relay 10, a current passes through the coil 12 whereby said relay 12 is operated, and by means of its contact 14 feeds the translating device T*n* forward at the same time causing it to prepare the next combination (as in the arrangement of the copending specification). Furthermore, by means of its contact 13 the relay 12 operates the relay 15 which, owing to this fact, places its armature on the same polarity as relay 10. It will therefore be seen that the checking frequency φ1 is thus associated with the frequency *f*1 (considered as the starting frequency) and similarly φ2 to *f*2.

At the same time as relay 10 operates, the current in leads 8—9 operate relay 3, thereby starting the distributor 2. The brush of distributor 2 as it passes over the contact P1 produces by acting on one of the relays 17 or 18, the transmission of *f*1 or *f*2 acting as a starting frequency, and then, as it passes over the five other contacts, the transmission of *f*1 or *f*2 acting this time as a signalling frequency, this being effected according to the polarity imparted to the corresponding lead 1 by the translating device T*n*.

It will be seen that these starting and signalling frequencies are thus transmitted in the form of successive pulses on the frequency *f*1 or *f*2. The signal pulses are preferably of equal duration whereas the starting pulse is of a substantially longer duration (the contact P1 being more elongated than the others) thereby permitting the receiver to differentiate the starting frequency as will be seen hereinafter. If, on the contrary, the previous transmission has been incompletely effected and the frequency φ2 instead of φ1 has been returned, the relay 10 does not move and consequently 12 and 15 remain stationary. On the other hand, the distributor is actuated by the relay 3, and it therefore again returns the previous character or type, with a preliminary starting frequency *f*1, thereby warning the receiver that a repeat is being effected as will be seen hereinafter.

The receiver, Fig. 2, has a circuit comprising relays 21 and 22 and leads 23 and 24. The direction of the current flowing through leads 23—24 characterizes the frequency *f*1 or *f*2 received. These leads supply the coil of the relay 25 (which operates in the same manner whatever may be the direction of the current which flows through it) and the coil of the relay 26, which places its armature on the + or — polarity according to the direction of the current in its coil. The armature 26 is connected to the brush of a distributor 27 similar to the distributor 2 of Fig. 1 and actuated by the relay 28. Through the control of relay 28, the brush of distributor 27 effects one and only one complete revolution from its inoperative position on the contact $q^0$. In this inoperative position the brush short circuits the contacts 29 and 30 arranged on the leads 31 and 32 which will be referred to hereinafter.

The five contacts, excluding $q^0$, of the distributor 27 are connected by the leads 33 to the corresponding energization coils of five similar relays 34 and of five similar relays 35, said coils for the different contacts being connected in series. The opposite ends of the coils 35 are connected in parallel to the lead 31. The relays 35 each have two contacts 36 and 37. The contacts 36, which are arranged in series, form a chain, and their simultaneous closure causes, as will be seen from the drawing, the energization of the coil of a relay 38. The relays 35 have a second winding connected between ground and armature of the contacts 37, said contacts being connected in parallel to the lead 39. The relay 38 has two contacts, one a single contact 40, the other double contacts 41. According as to whether the relay 38 is inoperative or operative, the armature of the contacts 41 imparts a predetermined polarity, for example negative polarity to the upper contact connected to the lead 39 or to the lower contact connected to the lead 42 supplying a relay 43 actuating a second distributor 44 with a brush 45 connected to the line 46.

The relays 34, according to the direction of the currents which flow through them, place their armatures on their positive or negative contacts. These armatures are connected by the leads 47 to the corresponding contacts of the distributor 44. The lead 48 connects the dead contact $q^0$ of the distributor 27 to the contact 40 of relay 38. A condenser 49 of appropriate capacity is connected between the leads 31 and 48. The coil of a relay 50, which is not polarized, is connected between the lead 31 and the armature of the contact 40. According to the direction of the current flowing through its coil, said relay 50 imparts a positive or negative polarity to its armature connected to the lead 32 which supplies, through the contacts 30, the coils of the relays 51 and 52 the armatures of which, according to the direction of the current flowing through said coils, impart a predetermined polarity, for example the negative polarity, either to the lead 53 controlling the transmission of the checking frequency $\varphi 1$ or to the lead 54 controlling the transmission of $\varphi 2$. The distributor 44 is provided, before and after the contacts to which the leads 47 are connected, with two additional contacts $r1$ and $r7$, connected in a fixed manner to predetermined polarities for a purpose which will be explained hereinafter.

The receiver operates as follows:

When there is no signal as in the case of static or fading, no current flows through the coils of relays 25 and 26. As soon as the starting frequency is received the relay 25 attracts its armature whereby a current flows through the coil 28 (the contacts 29 being closed since the distributor 27 is on the inoperative contact $q^0$). Relay 28 is delayed so that it only operates if the pulse received has a sufficient duration, thereby preventing its confusion with a signalling pulse which is too short to actuate it. At the same time the condenser 49 is charged with a polarity which is determined by the position of the armature of relay 26, i. e. by the frequency $f1$ or $f2$ received. As soon as the relay 28 operates, the distributor 27 starts rotating at the same speed as that at the transmitting station. For each contact passed over from $q^0$ the relay 25, if the transmission is correct, connects the leads 31 to earth, while 26 connects the suitable polarity in turn to each lead 33. Consequently the circuit 33, 34, 35 and 31 is closed, the relay 34 involved places its armature in the corresponding position and the selected relay 35 attracts its armature and closes the contacts 36 and 37. By means of the contacts 37, the relay 35 is locked, its hold-on coil remaining energized since the relay 38 is as yet inoperative.

If, at the completion of the rotation of the distributor 27, all the pulses have been received, the chain of contacts 36 is complete so that the relay 38 operates and attracts its armature.

The relay 38, by means of the lower contact 41, sets in operation the relay 43 which actuates the distributor 44 which, by its rotation, "reads" the polarities imparted by the relays 34 to the leads 47 and successively returns them through the line 46 to the translating device involved which has previously been set in operation by the wiper of distributor 44 passing over the first contact $r1$ connected to a predetermined polarity and which stops as said wiper passes over the contact $r7$ which is also connected to a fixed polarity. By the closing of the contact 40, the relay 38 further causes the discharge in a predetermined direction of the condenser 49 through the coil of the relay 50. This relay operates, and, contacts 30 being closed since 27 has become inoperative again, a predetermined polarity is imparted to the coils of relays 51 and 52, whereby one of the said relays operates and the checking frequency $\varphi 1$ or $\varphi 2$ is transmitted.

Finally the relay 38, by the operation of its armature 41, cuts off the supply to the hold-on coils of the relays 35. These five relays therefore return to their inoperative position.

If on the contrary one (or several) signalling frequencies has not been received the corresponding relay 35 remains open with resultant nonclosing of the contact chain 36. It follows that relay 38, and consequently relays 43 and 50, do not operate, and consequently as soon as the distributor 27 returns to its inoperative position (on the contact $q^0$) it is the same lead 53 or 54 which remains connected to the polarity (— in the drawing) of the armature of the relay 51 or 52. Since distributor 27, as it returns to its inoperative position, produces the transmission of the checking frequency, it follows that it is the same frequency which is returned a second time. This involves the repetition by the transmitter of the sending of the character or type previously transmitted. At this instant it is only necessary for the relays 35, which had not been operated the first time, to be actuated for the chain 36 to close, thereby producing the change of the checking frequency.

Distributors have been described both at the transmitting end and at the receiving end comprising as many contacts for the signalling as the code used comprises units (five in the drawings). It is obvious that it is possible to group several characters or types to be transmitted. For example, with a five unit code it is possible to use distributors with $4\times5=20$ signalling contacts by sending four characters in the same cycle. The operation and the apparatus is not changed, and a four-channel multiplex system is thus obtained.

Many modifications may be made to the embodiments described without departing from the scope of the invention.

What I claim is:

1. In a duplex telegraph system, the combination of a transmitter including a control circuit adapted to be energized in either direction, a relay adapted to be energized by said circuit, a main operative circuit for the transmitter the polarity of which is defined by said relay in accordance with the polarity of the control circuit, means whereby said main operative circuit controls the emission of the transmitted signals, a relay energized by said operative circuit, a distributor controlled by last mentioned relay and adapted to transmit first, a comparatively long signal for identification that is selected alternately from each of a pair of predetermined frequencies for the successive character signals and second, the elemental signals of the character signal, each of said elemental signals being selected according to a predetermined code from the frequencies of said pair of predetermined frequencies, and a receiver including means for receiving the signals transmitted by the transmitter, a main operative receiver circuit, switches inserted in series therein, relays energized by the successive incoming elementary signals, means whereby said switches remain closed until the succession of elemental signals has been received and means whereby the main operative receiver circuit closed by the closing of said switches controls the emission of a control signal that is alternately emitted on two frequencies of a second pair of frequencies and means whereby the arrival of a control signal energizes the transmitter control circuit with a predetermined polarity that changes from one control signal to the next.

2. In a duplex telegraph system the combination of a transmitter having means to transmit for each character signal a comparatively long identification signal at a frequency that changes from one frequency to another of a pair of frequencies between the transmission of one character signal and the next character signal, said transmitter also having means for transmitting a coded signal constituted by a succession of short pulses selected from said pair of frequencies and a receiver including a receiver circuit adapted to be energized with an electrical polarity determined by the frequency transmitted by the transmitter, a first distributor controlled by the energization of said circuit at the reception of the identification signal, said first distributor provided with a plurality of contact pieces, a second distributor, a first and a second set of relays in series with each of said contact pieces of said first distributor, means whereby the said first set of relays control the polarity of the contact pieces of said second distributor, hold up windings for said second set of relays, a main operative receiver circuit, a plurality of switches in said main operative circuit adapted to be closed by the energization of the corresponding ones of said second set relays and means whereby the energization of the operative circuit through the closing of the corresponding ones of said switches controls the polarities of said contact pieces of the second distributor, for said emission of the control signals on one of two frequencies alternately with one another from one character signal to the next and for the deenergization of said hold up windings for said second relays.

PHILIPPE YVES MARIE LE CALVEZ.

REFERENCES CITED

The following references are of record in the file of this patent:

UNITED STATES PATENTS

| Number | Name | Date |
|---|---|---|
| 2,235,755 | Bakker et al. | Mar. 18, 1941 |